May 29, 1923.  1,456,888

B. S. LEWIS

GREASE CUP

Original Filed April 8, 1921

Inventor

Brayton S Lewis.

By J. N. Hart.

Attorney

Patented May 29, 1923.

1,456,888

UNITED STATES PATENT OFFICE.

BRAYTON S. LEWIS, OF NEW BRITAIN, CONNECTICUT, ASSIGNOR TO THE STANLEY WORKS, OF NEW BRITAIN, CONNECTICUT, A CORPORATION OF CONNECTICUT.

GREASE CUP.

Application filed April 8, 1921, Serial No. 459,661. Renewed October 18, 1922. Serial No. 595,449.

*To all whom it may concern:*

Be it known that I, BRAYTON S. LEWIS, a citizen of the United States, and a resident of New Britain, county of Hartford, State of Connecticut, have invented certain new and useful Improvements in a Grease Cup, of which the following is a specification.

The object of the present invention is to provide a grease cup having features of novelty and advantage and particularly to provide a grease cup with means for preventing a gasket and washer with which it is provided from rotating relative to the base of the cup, this means also being adapted to serve in part as means for preventing accidental displacement of the cap of the cup relative to the base portion.

In the accompanying drawing:—

Figure 1:
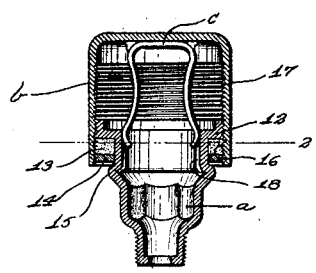
Fig. 1 is a vertical sectional view taken centrally through a grease cup constructed in accordance with the present invention.
Figure 2:
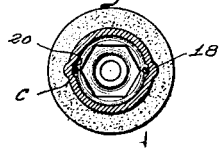
Fig. 2 is a sectional view taken on line 2—2 of Fig. 1.
Figure 3:
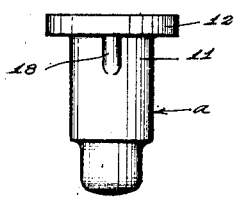
Fig. 3 is a side elevation of the partially formed base of the grease cup.
Figure 4:
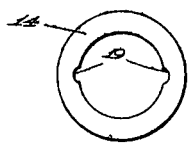
Fig. 4 is a view of the washer adapted to be secured to the base portion of the cup.

Referring to the drawings in detail, $a$ is the base of the grease cup, $b$ the cap, and $c$ a spring carried by the cap and engaging the base to prevent accidental unscrewing of the cap.

The base $a$ is preferably formed from a single sheet of metal drawn to the shape shown. The base $a$ comprises a circular body portion 11 having at its open end an integral head 12. About the body portion 11 and engaging the head is a gasket 13, and engaging against this gasket is a metallic washer 14. The numeral 15 designates an annular fold in the body portion, preferably formed by foreshortening or swaging the base, and this fold holds the washer 14 under pressure against the gasket 13. After the parts are assembled, as described, the peripheral edges of the head 12, the gasket 13 and the washer 14 are threaded as at 16 so that the threads on each of these members will be in threaded engagement with the thread 17 of the cap forming a tight joint therebetween when the base is screwed into the cap.

For the purpose of preventing the washer and gasket from rotating relative to the base $a$ during the threading operation, one or more vertical ribs or splines 18 are formed on the body portion 10, and the metallic washer has notches 19 which receive these ribs. It will be understood that, due to the interengagement of the ribs and notches, the washer and gasket are held against rotation on the body portion. Preferably, these ribs are formed by bending the wall of the cup outwardly during one of the drawing operations, thus providing internal vertical grooves 20. These grooves are of advantage in that the blade of a screw driver or other tool may be received thereby when it is desired to rotate the base. Furthermore, the free ends of the spring $c$ are adapted to engage in these grooves, and thus hold the cap against accidental rotary movement relative to the base.

It is, of course, obvious that my invention is susceptible of various modifications and changes which are within the spirit of the invention without departing from the scope of the following claim, it being understood that the present disclosure of my invention is by way of illustration only and it is not to be taken as restrictive of my conception.

I claim as my invention:—

In a grease cup, a base portion formed from a single piece of sheet metal having a head at one end, an annular fold in its side walls, and a rib between said head and fold; a gasket and a metallic washer between said head and fold; said washer having a notch receiving said rib; and a thread formed on the peripheral edges of said head, gasket and washer.

BRAYTON S. LEWIS.